June 19, 1956 L. D. STATHAM 2,751,476
ELECTRIC TRANSDUCER
Filed May 11, 1953 2 Sheets-Sheet 1
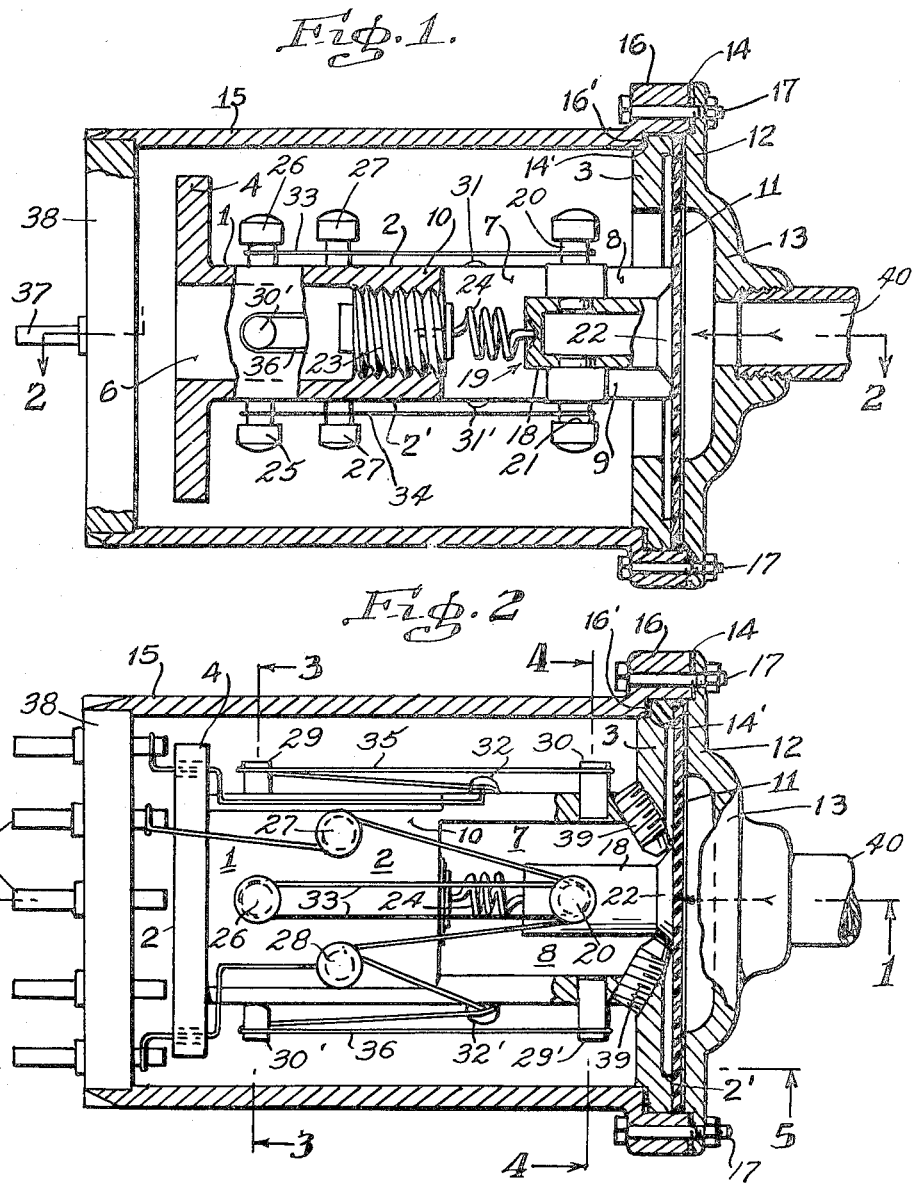
INVENTOR
LOUIS D. STATHAM
BY
ATTORNEY.

June 19, 1956 L. D. STATHAM 2,751,476
ELECTRIC TRANSDUCER

Filed May 11, 1953 2 Sheets-Sheet 2

INVENTOR
LOUIS D. STATHAM
BY
ATTORNEY.

United States Patent Office 2,751,476
Patented June 19, 1956

2,751,476

ELECTRIC TRANSDUCER

Louis D. Statham, Beverly Hills, Calif., assignor to Statham Laboratories, Inc., Los Angeles, Calif., a corporation of California Application May 11, 1953, Serial No. 354,294

8 Claims. (Cl. 201—63)

This invention relates to transducers which are designed to have a low acceleration response. This invention constitutes an improvement on the transducers described and claimed in the Statham Patent No. 2,455,883, patented December 7, 1948.

In that patent is described a form of strain wire transducer in which the strain wire is connected to the diaphragm of a pressure gage and also to a frame. In counter-distinction to the transducers such as are illustrated in the Statham Patent No. 2,573,286 and in the Carlson Patent No. 2,059,549, the transducer in Patent No. 2,455,883, in common with the transducer of this invention, has a movable member to which the strain wire is connected whose mass may be made to be much less than the mass of the movable member to which the strain wire is connected in the construction shown in said Carlson patent or in the Statham Patent No. 2,573,286.

Thus, if the pressure gage shown in the Statham Patent No. 2,455,883 is subjected to acceleration, the deflection of the diaphragm would be much less than if the same acceleration were imposed upon the transducer of the said Carlson patent or the transducer of said Statham Patent No. 2,573,286, assuming all of the transducers have similar spring rates, i. e., stiffness. The stiffness of the flexible bellows and spring suspension in the Carlson patent or of the diaphragm and springs in the Statham Patent No. 2,573,286, must be made much greater than the stiffness of the diaphragm in the Statham gage No. 2,455,883 in order to obtain the same deflection upon like acceleration of the gages.

Since the gages, if accelerated, would respond in the same way as if a fluid pressure had been imposed upon them, the deflection, due to acceleration, introduces an error into the reading of the gage.

For many reasons it may be impracticable to reduce the effect of this acceleration by increasing the stiffness of the diaphragm or spring suspension, since to do so would reduce the sensitivity of the gage to pressure application and also increase the natural frequency of the gage. The increase in the stiffness to reduce the displacement of the diaphragm when the gage is accelerated may increase the natural frequency of the gage so that it may not be suitable for uses where it is desirable that the gage have a low natural frequency or the stiffness of the gage may be made so great that it will not be sensitive for low ranges of pressure.

It is an object of my invention to reduce the effect of acceleration by reducing to low values the mass of the portions of the gage connected to the diaphragm.

It is the purpose of this improvement of the Statham electrical pressure strain gage of said Patent No. 2,455,883 to simplify the construction of said gage and increase the range of pressure which the gage may measure, that is, to increase the magnitude of the pressure variation which the gage is capable of reporting.

It is another object of my invention to improve the design of said electrical pressure strain gage to permit of the use of more flexible diaphragms than is practicably utilizable in said electrical pressure strain gage as described in said Patent No. 2,455,883.

It is another object of my invention to design a transducer having the characteristics of the transducer of said Patent No. 2,455,883 which will be more simple to wind and assemble than the transducer shown in said patent.

I accomplish these objectives by biasing the diaphragm with a string so that the transducer may be wound with the diaphragm in a deflected position and the spring used to overcome the tension of the wires to hold the diaphragm in an undeflected position when no pressure above a reference pressure, which may be atmospheric, is imposed on the gage.

In the preferred embodiment of my invention, I mount the diaphragm designed to transmit the pressure or other force to be measured on a relatively fixed frame. The diaphragm carries pins. Pins are also mounted in the frame. An electrical resistance strain wire is stretched between the pins in a direction substantially parallel to the axis of the diaphragm or in any other direction so that when the diaphragm, on deflection, will vary the tension in the strain wire. I also position a spring and a spring abutment in the frame in such manner that the spring bears against the diaphragm. I may thus by adjusting the spring vary the spring bias on the diaphragm. The above construction produces a gage having but a small mass mounted on the diaphragm so that the instrument has a low response to the forces produced by acceleration of the instrument.

These and other objects of my invention will be further described by reference to the drawings, in which Fig. 1 is a vertical section through the transducer with parts in elevation;

Fig. 2 is a section taken on line 2—2 of Fig. 1;

Figure 3:
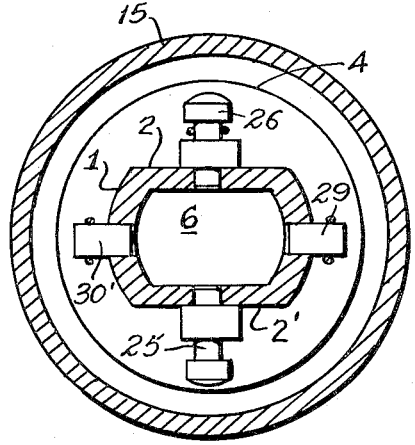
Fig. 3 is a section taken on line 3—3 of Fig. 2.
Figure 4:
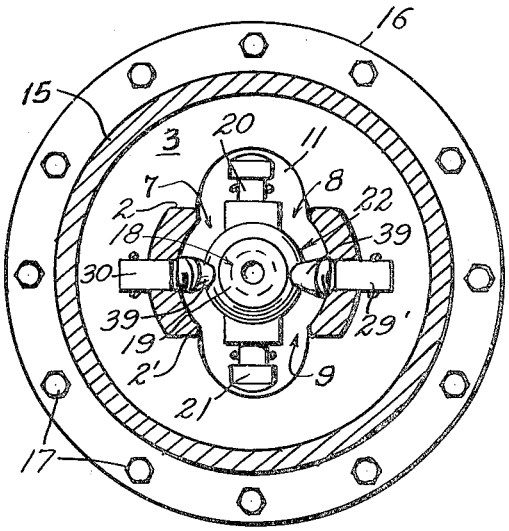
Fig. 4 is a section taken on line 4—4 of Fig. 2.
Figure 5:
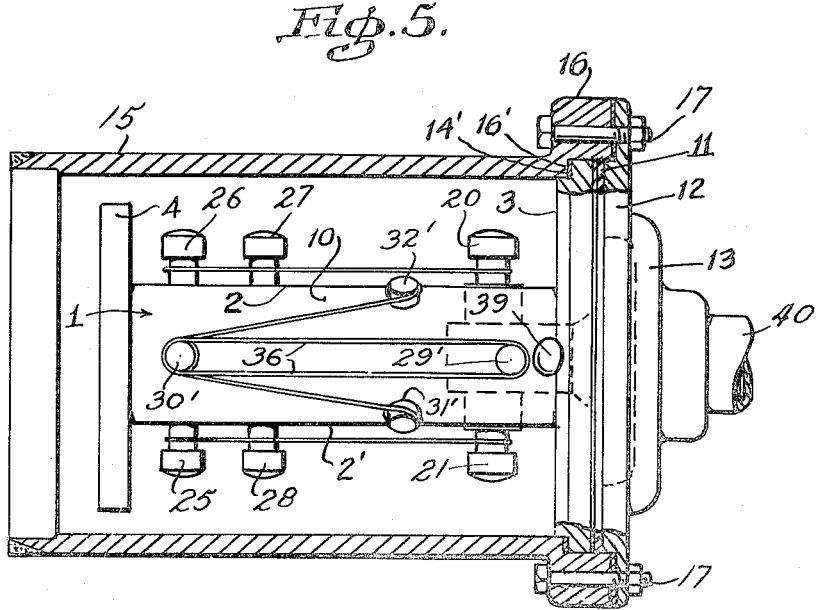
Fig. 5 is a section taken on line 5—5 of Fig. 2.

Cylinder frame 1 is squared off at the top and bottom to give parallel faces 2 and 2' and carries circular end flanges 3 and 4. The frame is bored at its ends to give a recess 6 and recess 7 separated by a wall 10. The recess 7 is intercepted by slots 8 and 9 formed in the parallel faces 2 and 2' of the frame. Mounted upon flange 3 is a flexible diaphragm 11 spot welded at its periphery to the flange 3 to give a fluidtight joint. The flange 3 is clamped between the flange 12 of the cap 13 and in the bore 16' of the flange 16 of the case 15 by means of bolts 17 passing through the flanges 12 and 16. Suitable gaskets 14 and 14' are provided to make fluid-tight joints.

Secured to the central portion of the diaphragm 11 is a hollow post 18 sealed at its end by an end wall 19. The post 18 carries two coaxial pins 20 and 21 positioned in the post 18 perpendicular to the axis thereof. The post extends perpendicular to the diaphragm. The post 18 is mounted on a conical boss 22 positioned centrally of the diaphragm. Threaded into a bore in wall 10 is a screw 23 axially aligned with the post 18 and the diaphragm 11 and carrying a spring 24 which bears against the end 19 of the hollow post 21. Two coaxial pins 25 and 26 are mounted in the parallel faces 2 and 2' of the frame 1 adjacent the flange 4. Pins 25 and 26 are aligned with the pins 20 and 21, respectively. Each of the parallel faces 2 and 2' carries two terminal pins 27 and 28. Mounted on the cylinder portions of the frame 1, one on each side thereof, are aligned pins 29 and 30, and on the other side are mounted pins 29, and 30' adjacent to each of the flanges 3 and 4. Mounted on one of the circular portions of the frame are terminal pins 31 and 32, and pins 31' and 32' are mounted on the other circular side.

A strain wire 33 is wound in tension between pins 26 and 20 in a loop, one end of the loop terminating at pin 27 and the other end terminating at pin 28 mounted in the same face as pins 26 and 20. Another loop of wire 34 is wound in tension between pins 25 and pin 21, one end of said loop terminating at pin 27 and the other end terminating at terminal pin 28 mounted in the same face as are 25 and 21. A strain wire 35 is looped in tension about pins 29 and 30, one end terminating in pin 32 and the other end of the loop terminating in pin 31. A strain wire 36 is looped in tension between pins 29' and 30', one end of the loop terminating at 31' and the other at 32'. At the flange 3 are two angularly disposed set screws 39 whose ends may be positioned adjacent the conical boss 22 and whose adjustment limits the maximum deflection of the diaphragm 11. All pins are electrically insulated and the wires are out of contact with the frame.

It will be seen that the deflection of the diaphragm 11, by pressure introduced through the entrance port 40 in the cap 13, will cause the post 18 to move inwardly against the spring 24, causing the pins 20 and 21 to be moved in the slots 8 and 9. Since the pins 25 and 26 are stationary, the tension in the wires 33 and 34 will be relaxed. Pins 29, 29', 30 and 30' being stationary, the tension in the wires 35 and 36 are unaffected by the deflection of the diaphragm. The ends of the four loops are connected to insulated terminals 37 positioned in cap 38 in a Wheatstone bridge arrangement. The cap 38 is suitably secured on the case 15.

In assembling the gage, with the frame not yet in the case 15 and the cap 13 not being in place, a post is cemented to the face of the diaphragm opposite to that of which the post 18 is mounted. The wires are wound in tension between posts 20 and 26 and also between posts 25 and 21. The wires 35 and 36 are also wound on the posts 29 and 30 and also 29' and 30'. The wire ends are anchored as described above. The cemented post is then removed from the diaphragm. The tension in the wires draws the diaphragm to bow the diaphragm toward the flange 3 away from the neutral, i. e., undeflected position of the diaphragm. The set screws 39 having been adjusted, the screw 23 is adjusted to bring the diaphragm to neutral position. The bore 6 permits of the insertion of a tool for this purpose. The frame is then secured in the case 15 and clamped between the flanges 16 and 12 by means of bolts 17. It will be seen that the spring is thus adjusted so that it balances the tension in the wires. By adding the stiffness of the spring to the stiffness of the diaphragm to balance the tension in the wires, I may employ a more flexible diaphragm than could be permissible for like stress in the wires if the spring bias were omitted.

While I have described a particular embodiment of my invention for the purpose of illustration, it should be understood that various modifications and adaptations thereof may be made within the spirit of the invention as set forth in the appended claims.

I claim:

1. A transducer comprising a frame, a diaphragm mounted on said frame, a wire mounting structurally united to said diaphragm, an electrical resistance strain wire connected to said wire mounting, a connection between said wire and said frame, a spring mounted in said frame, said spring being connected to said diaphragm, and means for adjusting said spring.

2. A transducer comprising a frame, a diaphragm mounted on said frame, said frame having a bore axially aligned with said diaphragm, a screw in said bore, a spring connected to said screw and to said diaphragm, a wire mounting structurally united to said diaphragm, an electrical resistance wire connected to said wire mounting and a second connection between said wire and said frame.

3. A transducer comprising a frame, a diaphragm mounted on said frame, a post mounted centrally of said diaphragm, a bore in said frame, a screw in said bore, a spring connected to said screw and to said post and an electrical resistance strain wire connected to said post and said frame.

4. A transducer comprising a frame, a flange at one end of said frame, a diaphragm mounted on said flange, a bore in the other end of said frame, a wall in said frame at the end of said bore, a screw mounted in said wall, a post centrally mounted on said diaphragm on the side adjacent said wall, a spring mounted on said screw and abutting said post, pins mounted on said post, pins mounted on said frame in alignment with the pins on said post, and strain wire looped in tension between the pins on said post and the pins on said frame.

5. A transducer comprising a frame, a diaphragm mounted on said frame, a wire mounting structurally united to said diaphragm, an electrical resistance strain wire connected to said wire mounting, a connection between said wire and said frame, said wire extending in tension between said mountings, a spring support on said frame, a spring support on said diaphragm and a spring mounted on said supports and stressed between said supports.

6. A transducer comprising a frame, a diaphragm mounted on said frame, a wire mounting structurally united to said diaphragm, an electrical resistance strain wire connected to said wire mounting, a wire mounting structurally united to said frame, said wires extending in tension between said mountings, an adjustable spring support on said frame, a spring support on said diaphragm and a spring mounted on said supports and stressed between said supports, said adjustable spring support being adjustable to adjust the stress in said spring to adjust the spring bias on said diaphragm.

7. A transducer comprising a frame, a diaphragm mounted on said frame, a bore in said frame axially aligned with said diaphragm, a screw in said bore, a spring connected to said screw and to said diaphragm, a wire mounting structurally united to said diaphragm, an electrical resistance wire connected to said wire mounting and a second connection between said wire and said frame, said screw being positioned to compress the said spring between the said screw and said diaphragm.

8. A transducer comprising a frame, a flange at one end of said frame, a diaphragm mounted on said flange, a bore in the other end of said frame, a wall in said frame at the end of said bore, a screw mounted in said wall, a post centrally mounted on said diaphragm on the side adjacent said wall, a spring mounted on said screw and abutting said post, pins mounted on said post, pins mounted on said frame in alignment with the pins on said post, and strain wire looped in tension between the pins on said post and the pins on said frame, said screw being positioned to compress the said spring between the said screw and said diaphragm.

References Cited in the file of this patent

UNITED STATES PATENTS

| | | |
|---|---|---|
| 2,455,883 | Statham | Dec. 7, 1948 |
| 2,494,621 | Jones | Jan. 17, 1950 |